Figure 3:
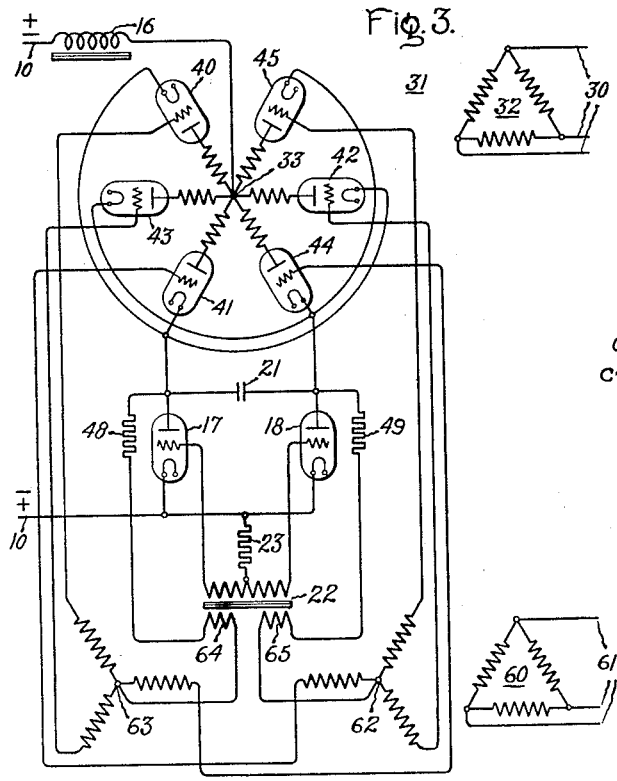

Feb. 6, 1934.                A. H. MITTAG                1,946,292
                    ELECTRIC VALVE CONVERTING APPARATUS
                    Filed Oct. 1, 1931        2 Sheets-Sheet 1
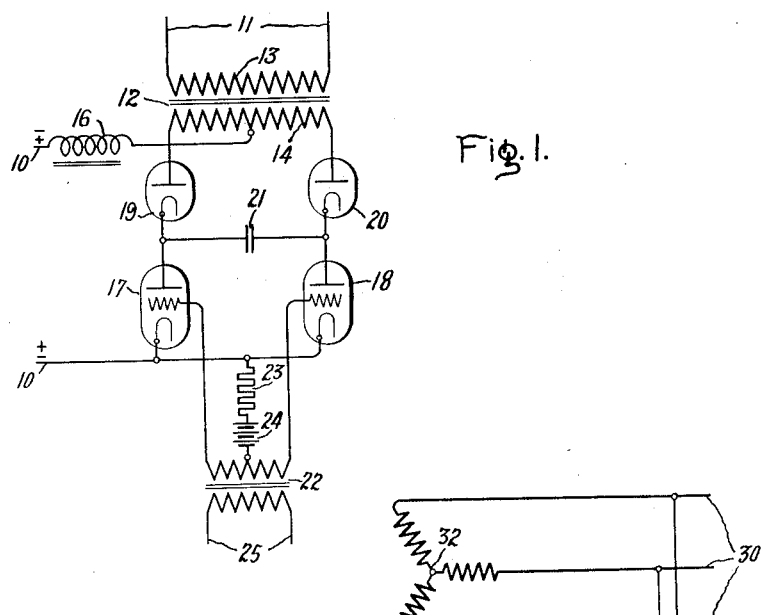
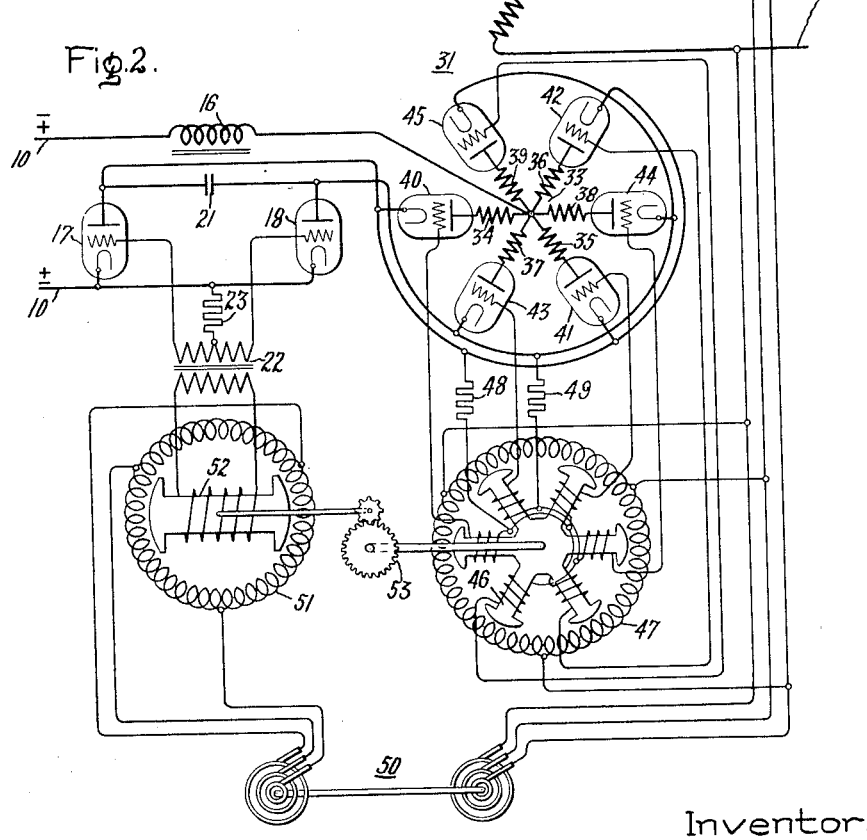
Inventor:
Albert H. Mittag,
by Charles W. Mullan
His Attorney.

Inventor:
Albert H. Mittag,
by Charles E. Tulla
His Attorney.

Patented Feb. 6, 1934

1,946,292

UNITED STATES PATENT OFFICE 1,946,292

ELECTRIC VALVE CONVERTING APPARATUS

Albert H. Mittag, Schenectady, N. Y., assignor to General Electric Company, a corporation of New York Application October 1, 1931. Serial No. 566,375

12 Claims. (Cl. 175—363)

My invention relates to electric valve converting apparatus and more particularly to such apparatus adapted to transmit energy between direct and alternating current circuits.

Heretofore, there have been devised numerous apparatus including electric valves for transmitting energy between direct and alternating current circuits or alternating current circuits of different frequencies. When operating such apparatus as a rectifier, transmitting energy from an alternating current circuit to a direct current circuit, it has been customary to control the average voltage of the direct current circuit by retarding the phase of the grid potentials of the several electric valves with respect to their anode potentials. The effect of this type of control is to draw a lagging current from the alternating current circuit, while on the other hand it is usually preferable to draw a leading current in order to improve the power factor of the system. In the majority of the arrangements of the prior art, however, it has not been possible to operate such a controlled rectifier at leading power factors, since this type of operation involves the transfer of the load current from one valve to the next succeeding valve in opposition to the electromotive force of the inductive winding interconnecting the valves. On the other hand, when operating such apparatus as an inverter, transmitting energy from a direct current circuit to an alternating current circuit, it has not been possible ordinarily to supply lagging loads on the alternating current without the provision of an inordinate amount of commutating capacitance. This is due to the fact that a lagging power factor on the alternating current circuit corresponds to a transfer of load between the several electric valves at points in the cycle of alternating potential when the counter electromotive force of the inductive winding connected between the valves opposes such commutation. The same principles apply when transmitting energy from an alternating current circuit of another frequency or the same frequency. In many cases, however, it is desirable to supply a lagging power factor alternating current load by means of an electric valve converting apparatus.

In United States Letters Patent No. 1,929,720, granted October 10, 1933, upon an application of C. H. Willis, and assigned to the same assignee as the present application, there is disclosed an electric valve converting apparatus by means of which energy may be transmitted from a direct current supply circuit to a lagging power factor alternating current load circuit. My invention relates to an improved apparatus of the type disclosed in the above mentioned patent and a method of operating the same by means of which the apparatus may be operated as a controlled rectifier, transmitting energy from the alternating current circuit to the direct current circuit at a leading power factor on the alternating current circuit.

In United States Letters Patent No. 1,929,721, No. 1,929,722 and No. 1,929,725, granted October 10, 1933 upon applications of C. H. Willis, all assigned to the same asignee as the present application, there are disclosed several electric valve converting apparatus by means of which energy may be transmitted in either direction between direct and alternating current circuits at any desired power factor on the alternating current circuit. My invention relates also to an improved electric valve converting apparatus of the type disclosed in these last mentioned patents which is particularly suitable for operating at very low frequencies.

It is an object of my invention to provide an improved electric valve converting apparatus and a method of operating the same by means of which energy may be transmitted from an alternating current supply circuit to a direct current load circuit under leading power factor conditions on the alternating current circuit.

It is another object of my invention to provide an improved electric valve converting apparatus by means of which energy may be transmitted from a direct current supply circuit to a lagging power factor alternating current load circuit.

It is a further object of my invention to provide an improved electric valve converting apparatus by means of which energy may be transmitted between direct and alternating current circuits under any desired power factor conditions on the alternating current circuit.

In accordance with one modification of my invention, an electric valve converting apparatus comprising an inductive winding or network and a plurality of electric valves interconnecting direct and alternating current circuits is provided with two serially connected electric valves interconnected between each terminal of the inductive winding or network and one side of the direct current circuit, and a commutating capacitor is connected between the common connections of adjacent pairs of valves. In certain of the arrangements, the valves immediately adjacent the inductive windings may be two element valves, that is, simple rectifying valves, while in certain of the polyphase arrangements all of the valves must be grid controlled valves. In the latter case, a single pair of valves connected immediately to the direct current circuit may be used instead of a valve associated with each phase winding. In case energy is being supplied to a p-phase polyphase system, the grid excitation of the pair of valves connected immediately to the direct current circuit will necessarily be p times that of the valves connected immediately to the inductive network. With such an arrangement it has been found that energy may be transmitted readily from the direct current circuit to a lagging power factor alternating current load circuit because of the fact that the commutating capacitor becomes charged to the maximum potential of the associated inductive winding but, due to the valve interposed between this capacitor and the inductive winding, it cannot follow the potential of the winding as it drops below its maximum but retains the maximum charge until the instant when it is required for commutation. With the apparatus operating as a controlled rectifier, however, drawing leading current from the alternating current circuit, it has been found that the control of the power factor may not be obtained by simply advancing the phase of the grid potentials of the several electric valves as in the arrangement disclosed in certain of the Willis applications mentioned above, but that control may be obtained only by shifting the grid potentials from a lagging phase angle through phase opposition until they are retarded into the leading quadrants. When this control has been obtained, however, the power factor of the alternating current may be readily controlled by either advancing or retarding the grid potentials in the leading quadrants.

In accordance with another embodiment of my invention, an electric valve converting apparatus of the type disclosed in the above mentioned Patents, No. 1,929,721 and No. 1,929,722, in which an independent commutating potential for the main electric valves is provided by means of an auxiliary commutating winding and a serially connected capacitor, is provided with an additional pair of electric valves connected between the commutating winding and the commutating capacitor as in the arrangement described above. By means of these additional valves, the maximum commutating potential may be retained upon the capacitor to enable the apparatus to be operated at extremely low frequencies.

Figure 5:
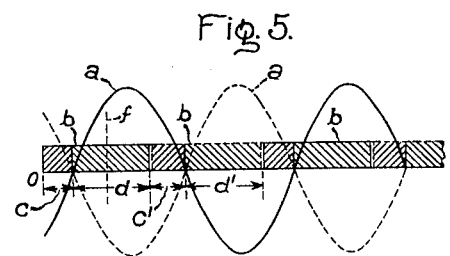
Figure 4:
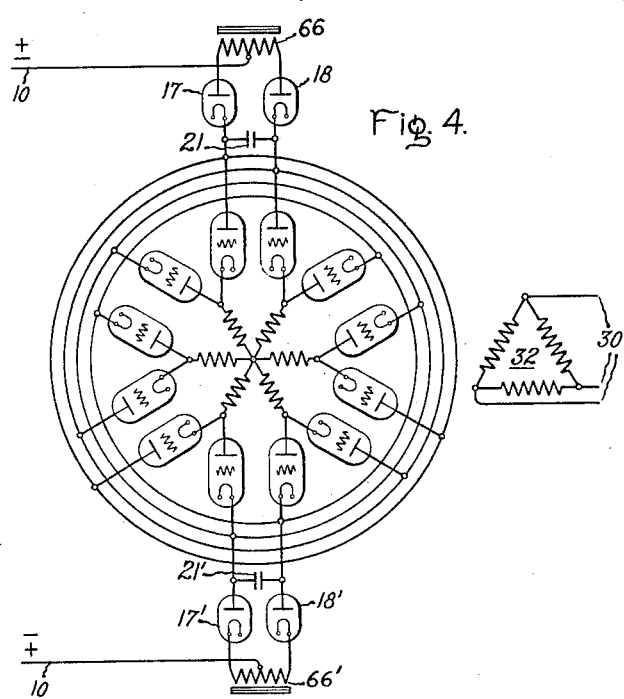
Figure 6:
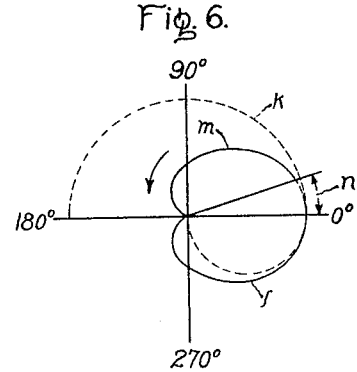

For a better understanding of my invention together with other and further objects thereof reference is had to the following description taken in connection with the accompanying drawings and its scope will be pointed out in the appended claims. Fig. 1 of the accompanying drawings illustrates my invention as applied to an arrangement for transmitting energy between a direct current circuit and a single phase alternating current circuit; Fig. 2 illustrates an extension of the arrangement of Fig. 1 for transmitting energy between direct and polyphase alternating current circuits; Fig. 3 shows an improved grid excitation circuit for the electric valves which is particularly suitable for a polyphase arrangement such as that shown in Fig. 2; Fig. 4 illustrates my invention as applied to an apparatus of the type disclosed in the above mentioned Patents, No. 1,929,721 and No. 1,929,722 in which an independent commutating potential is provided for transferring the load current between the several electric valves, while Figs. 5 and 6 are diagrams to aid in the understanding of my invention.

Referring now to Fig. 1 of the drawings I have illustrated an arrangement for transmitting energy between a direct current circuit 10 and an alternating current circuit 11. This converting apparatus includes a transformer 12 having a winding 13 connected to the alternating current circuit 11 and a winding 14 provided with an electrical midpoint connected to one side of the direct current circuit 10 through a smoothing reactor 16. The outer terminals of the winding 14 are connected to the other side of the direct current circuit through a pair of electric valves 17 and 18 in series with a pair of auxiliary electric valves 19 and 20, respectively. A commutating capacitor 21 is connected between the common connections of the serially connected valves. Each of the electric valves 17 to 20 inclusive is provided with an anode and a cathode and may be of any of the several types well known in the art although I prefer to use valves of the vapor electric discharge type. The valves 17 and 18 are also provided with control grids by means of which the power factor on the alternating current circuit may be controlled and its frequency determined, in case it is not connected to an independent source of electromotive force. The grids of the valves 17 and 18 are connected to the common cathode circuit through opposite halves of the secondary winding of a grid transformer 22, a current limiting resistor 23, and a negative bias battery 24. The primary winding of grid transformer 22 is energized from an alternating current control circuit 25 supplied with an alternating potential of the desired frequency and variable in phase in order to control the electric valve converting apparatus. In case the alternating current circuit 11 is connected to an independent source of electromotive force, the circuit 25 may be energized therefrom through any suitable phase shifting arrangement, examples of which are well known in the art.

Disregarding for the moment the auxiliary electric valves 19 and 20, and assuming that the apparatus is operating as an inverter, transmitting energy from the direct current circuit 10 to the alternating current circuit 11, the operation of the above described apparatus will be well understood by those skilled in the art or may be found explained in detail in United States Letters Patent No. 1,800,002 granted April 7, 1931 upon the application of E. F. W. Alexanderson. In brief current first flows from the direct current circuit 10 through one half of the winding 14 and one of the electric valves, for example, valve 17, inducing a half cycle of alternating potential in the secondary winding of the transformer 12 and at the same time charging up the commutating capacitor 21 to substantially twice the potential of the direct current circuit. When the grid potential reverses its polarity, electric valve 18 is made conductive, and capacitor 21 transfers the current from the valve 17 to the valve 18 so that the load current flows through the winding 14 in an opposite direction, inducing the successive half cycle of alternating potential in the winding 13. In this manner the load current is successively transferred between the electric valves 17 and 18 at the frequency of the alternating current circuit 25 and an alternating current is delivered to the circuit 11. It will also be well understood by those skilled in the art that, in case the alternating current circuit 11 is connected to a load having a counter electromotive force, the commutating capacitor 21 may be omitted and the current transferred between the valves 17 and 18 by the counter electromotive force of the winding 14. In either of the above cases, however, it is ordinarily possible to supply only leading power factor loads on the alternating current circuit unless an inordinate amount of commutating capacitance is provided to supply the magnetizing current of the load circuit. This is because of the fact that, under lagging power factor conditions on the alternating current circuit 11, the counter electromotive force of the winding 14 is such as to oppose commutation between the valves 17 and 18. The addition of a commutating capacitor 21 of a moderate size will not alone ordinarily suffice since it is connected directly across the winding 14 and its potential will rise and fall with that of the winding and will not be of the proper polarity to produce commutation at the desired instants.

However, by interposing electric valves 19 and 20 between the terminals of the winding 14 and the commutating capacitor 21, the operation is substantially modified. Assuming, for example, that electric valves 19 and 17 are conducting the load current of the apparatus, as described above, a charging circuit will then be completed for the capacitor 21 from the positive side of the direct current circuit 10, the right-hand portion of transformer winding 14, electric valve 20, capacitor 21, and electric valve 17 to the other side of the direct current circuit. The potential induced in the right-hand portion of the winding 14 by the load current flowing in the left-hand portion will be substantially equal to that of the direct current supply circuit, and this will act cumulatively with respect to the potential of the supply circuit in charging the capacitor 21 to a potential substantially twice that of the supply circuit. After the electromotive force of the winding 14 has passed its maximum value, however, the right-hand terminal of the winding 14 will be less positive and the right-hand terminal of the capacitor 21, their left-hand terminals being connected through conductive valve 19, with the result that the potential across the electric valve 20 will be such as to tend to produce a current in the direction opposite to the normal conductivity of the valve 20. This current, which would become a discharge current of the capacitor 21, is thus suppressed and a maximum instantaneous potential of the winding 14 is retained on the capacitor 21 until the instant when it is required for commutation. For example, if valve 17 has been conducting current and valve 18 is made conductive, the right hand terminal of capacitor 21 will be charged to the maximum instantaneous positive potential of the winding 14 and the current will be commutated from the valve 17 to the valve 18. The load current now tends to flow through valve 19, capacitor 21 and valve 18 but capacitor 21 very quickly becomes charged to such a potential as to force the load current against the counter electromotive force of the winding 14 through electric valves 20 and 18. With this arrangement the transfer of load current from the valve 17 to the valve 18 may be delayed nearly 90 electrical degrees after the counter electromotive force of the winding 14 has reversed polarity and, if the valve 18 is then made conductive, the commutating potential of the capacitor 21 will still be of such a magnitude and polarity as to initiate a discharge in valve 18 and interrupt the current in the valve 17; that is, such an apparatus is capable of supplying alternating current loads of nearly zero power factor lagging.

The operation of the above described apparatus as a rectifier drawing leading currents from the alternating circuit 11 will be understood more clearly by reference to Figs. 5 and 6 which represent certain operating conditions of the apparatus. Referring to Fig. 5, the curves $a$ represent the potentials of the two halves of the winding 14 and, with the grid potentials of the valves 17 and 19 advanced through an angle $c$ with respect to the anode potentials, the curves $b$ represent corresponding periods of conductivity of the two sets of valves. If it be assumed that the apparatus is energized or that the grids of the valves 17 and 18 are excited initially at the point $o$ and the valve 17 is initially made conductive, it will be noted that during the interval $c$ the capacitor 21 will be charged through the valves 20 and 17 so that the right hand terminal is positive. No load current will flow during this interval, however, since electric valve 18 is nonconductive and the left-hand terminal of inductive winding 14 is negative. When the potential of the winding 14 reverses polarity, however, load current will flow through the valves 17 and 19 during the interval $d$. At the end of this interval the grid potential reverses polarity so that valve 18 is made conductive. The positive charge stored on capacitor 21 during the interval $c$ now commutates the current between the valves 17 and 18 and the voltage of reactor 16 forces the load current through the valves 18 and 20 against the counter electromotive force of the winding 14 during the interval $c'$. During this interval $c'$ it will be noted that the condenser 21 becomes charged to an opposite polarity through electric valves 19 and 18. This positive charge is stored on the condenser until the end of the interval $d'$ when it is effective to transfer the load current from the valve 18 to the valve 17. In this manner it is seen that the current is commutated between the electric valves before the potential of the winding 14 reverses polarity and a leading current is drawn from the alternating current circuit 11.

In the ordinary operation of the apparatus, however, it would be difficult to initiate the grid excitation exactly at the point $o$. On the other hand, if the grid excitation should commence at the point $f$, it would mean that a current would be started in electric valve 17, which is conductive, which would flow for the remainder of that half cycle, since there is no initial charge of a capacitor 21 to transfer the current from the valve 17 to the valve 18 at the end of the interval $d$. Because of the fact that the valves 17 and 19 are conductive during the complete half cycle no charge will be stored upon the condenser during the interval $c'$ and the apparatus will operate as an ordinary full wave rectifier with a leading grid potential.

If the direct current circuit is highly inductive the average output of a rectifier for various phase angles of the grid potential will be represented by the dotted curve $k$ of the Fig. 6. If the load is slightly less inductive the average output through the lagging quadrant will be represented by the solid curve $l$. If now the grid potential be retarded through the lagging quadrant to direct phase opposition so that no current is being transmitted by the apparatus and then still further retarded until it reaches the leading quadrant, the average output of the rectifying apparatus may be represented by the curve $m$. This operation is due to the fact that with the grid potential in direct phase opposition, the capacitor 21 becomes charged at reversed polarity during each complete half cycle so that the periods $c$ and $c'$ are extended to a full 180° and no load current flows in the apparatus. Under this condition, commutating capacitor 21 affords the maximum commutating potential. If now the grid potential be retarded still further so that it comes within the leading quadrant, there is provided an initial charge on the capacitor 21 to commutate the current between the valves at the beginning of each interval $c, c'$, etc. In this way the apparatus may be controlled to draw leading current from the alternating current circuit at any desired power factor. The limiting condition corresponds to that interval $c, c'$, etc. during which the capacitor 21 becomes charged to just a potential sufficient to commutate the current between the valves 17 and 18; that is, substantially twice the arc drop in these valves. This is represented by the angle $n$ of Fig. 6; that is, the above described apparatus is capable of supplying energy between the direct current and alternating current circuits at any desired power factor from substantially zero to substantially 90° leading or lagging.

In Fig. 2 I have illustrated my invention as extended to a polyphase system, which may be either half wave or full wave and of any number of phases, but I have illustrated by way of example a six-phase half-wave inverter, the transformer connections being such as to supply a three-phase full wave alternating current circuit. This apparatus comprises a polyphase transformer 31 provided with a three-phase winding 32 connected to an alternating current circuit 30 and a six-phase winding 33 connected to the direct current circuit 10 through a plurality of electric valves. The arrangement is such as to enable the use of a single pair of main valves 17 and 18 and a single commutating capacitor 21 as in the arrangement shown in Fig. 1. The positive direct current terminal is connected through a smoothing reactor 16 to the neutral of the winding 33 while the terminals of alternate phase windings 34, 35 and 36 are connected to the anode of the main electric valve 17 through electric valves 40, 41 and 42 respectively, and the terminals of the other alternate phase windings 37, 38 and 39 are connected to the anode of the main valve 18 through electric valves 43, 44 and 45 respectively. As in the previous arrangement, each of the several valves 40 to 45 inclusive is provided with an anode, a cathode and control grid, and is preferably of the vapor electric discharge type. The grids of the several electric valves 40 to 45 inclusive are energized from the secondary member 46 of a rotary phase shifting transformer 47, which may be energized directly from the alternating current circuit 30, in case its frequency is fixed by other apparatus, or from any suitable source of polyphase current of a frequency which it is desired to supply to the circuit 30. The secondary member 46 of the transformer 47 is provided with six phase windings which are connected in alternate groups of three, as illustrated, for connection through current limiting resistors 48 and 49 with the common cathode circuits of electric valves 40, 41 and 42, and 43, 44 and 45, respectively. The rotary phase shifting transformer 47 should be made self-saturating or separate means should be interposed between this transformer and the grids of the several electric valves to insure that they receive an excitation of peaked wave form, since each valve is to be made conductive for only sixty electrical degrees. However, this feature of supplying peaked excitation to the valve grids forms no part of my present invention, but is disclosed and broadly claimed in the copending application of B. D. Bedford, S. N. 485,335, filed September 29, 1930, and assigned to the same assignee as the present application. In this arrangement it is necessary to provide electric valves 17 and 18 with a grid control potential having a frequency three times that supplied to the grids of electric valves 40 to 45 inclusive. This triple frequency grid excitation may be provided by means of a rotary frequency changer 50, one side of which is connected to the alternating current circuit 30, or to the source of grid potential for valves 40 to 45 inclusive. The primary winding of grid transformer 22 is connected to the secondary winding 52 of a rotary phase shifting transformer 51 energized from the frequency changer 50. The rotary members of the phase shifting transformers 47 and 51 are interconnected through the gearing 53 which has a three to one ratio. This connection is necessary because of the fact that in controlling the power factor at which energy is transmitted between the circuits 10 and 30, it is necessary to shift the grid potentials of electric valves 17 and 18 by three times the angle that the grid potentials of the valves 40 to 45 are shifted.

The operation of the above described polyphase arrangement is substantially similar to that of the single phase arrangement described in connection with Fig. 1. When the apparatus is operating as an inverter transmitting energy from the direct current circuit 10 to the alternating current circuit 30, the commutating capacitor 21 becomes charged to the maxiumum potential difference between adjacent phase windings and retains its maximum charge until the instant when it is desired to commutate the current between valves associated with one winding and the next succeeding winding. In this arrangement, the electric valves 17 and 18 serve the purpose of commutating the load current between the valves 40–45 inc., through connections to alternate valves as illustrated. Obviously, as stated above, current must be commutated between these valves at triple frequency. Similarly while operating the above described apparatus as a rectifier transmitting energy from the alternating circuit 30 to the direct current circuit 10 at leading power factors the capacitor 21 is charged while the load current is being conducted through one valve and this charge is retained to commutate the current between that valve and the next succeeding valve at the desired instant.

In Fig. 3 is shown a somewhat similar but simplified grid excitation circuit for the several electric valves of a converting apparatus similar to that of Fig. 2. This arrangement comprises a grid transformer having a primary winding 60 connected to the circuit 61 which may be energized from any suitable source of variable phase control potential as, for example, a rotary phase shifting transformer energized from the alternating current circuit 30, and two Y connected secondary windings 62 and 63 displaced 180 electrical degrees. As in the arrangement of Fig. 2, means should be provided for converting the grid potential of valves 40–45 inc., to one of peaked wave form. The electrical neutrals of the Y connected windings 62 and 63 are connected to the common cathode circuits of their associated electric valves through current limiting resistors 48 and 49 and the windings 64 and 65 of a second grid transformer 22. The secondary winding of the grid transformer 22 is connected to energize the grids of the valves 17 and 18 through the current limiting resistor 23. As will be well understood by those skilled in the art, the polyphase windings 62 and 63 together with the grid and cathode circuits of their associated valves comprise a pair of polyphase rectifiers with the windings 64 and 65 in their direct current circuits. It is well known that a triple frequency potential occurs in a direct current circuit of such a rectifying apparatus. Since the windings 62 and 63 are oppositely connected, these two triple frequency currents combine in the windings 64 and 65 to supply triple frequency full wave alternating potentials to excite the grids of the valves 17 and 18.

In Fig. 4 there is illustrated an application of my invention to a six-phase full wave valve converting apparatus of the type disclosed in the above mentioned Willis Patent No. 1,929,721. In this modification, the commutating capacitors 21 and 21' are connected in series circuit relationship with the load current of the apparatus by means of the commutating reactors 66 and 66', each provided with an electrical midpoint connected to one side of the direct current circuit. In this arrangement, during an interval in which one pair of electric valves is conductive the capacitors 21 and 21' become charged at one polarity to a potential proportional to the amount of load current flowing. During the next successive interval when the next successive pair of electric valves is conducting these capacitors become charged to equal potentials of opposite polarity. In this arrangement, the phase of the commutating potential of the capacitors 21 and 21' is automatically varied with the phase of the load current of the apparatus so that the maximum commutating potential is always available at the desired instant of commutation. By including electric valves 17 and 18 and 17' and 18' between the commutating reactors 66 and 66' and their associated capacitors 21 and 21', the apparatus may be operated at extremely low frequencies without the danger of the capacitors discharging through reactors 66 and 66'. Obviously this arrangement is equally applicable to a single phase valve converting apparatus as described in Patent No. 1,929,722, mentioned above.

While I have described what I at present consider the preferred embodiments of my invention, it will be obvious to those skilled in the art that various changes and modifications may be made without departing from my invention, and I therefore, aim in the appended claims to cover all such changes and modifications as fall within the true spirit and scope of my invention.

What I claim as new and desire to secure by Letters Patent of the United States, is:

1. Apparatus for transmitting energy between direct and alternating current circuits under any desired power factor conditions on said alternating current circuit comprising an inductive winding in energy transmitting relation with respect to said alternating current circuits, two pairs of serially connected electric valves interconnecting said winding with one side of said direct current circuit, and a connection from said winding to the other side of said direct current circuit, means for successively rendering a valve of each pair alternately conductive and nonconductive, and a commutating capacitor connected between the common connections of said pairs of valves.

2. Apparatus for transmitting energy between direct and alternating current circuits under any desired power factor conditions on said alternating current circuit comprising an inductive winding provided with an electrical midpoint for connection to the direct current circuit, a two electrode electric valve connected to each terminal of said winding, a commutating capacitor connected between said valves, a pair of three electrode electric valves each having one terminal connected to a terminal of said two electrode valves and having their other terminals connected together for connection to the other side of said direct current circuit, and means for successively rendering said three electrode valves alternately conductive and nonconductive.

3. The method of transmitting energy from an alternating current circuit to a direct current circuit under leading power factor conditions on said alternating current circuit by means of a grid controlled electric valve converting apparatus including a commutating capacitor, and means for storing a charge on said capacitor which comprises exciting the grids of said apparatus with an alternating potential synchronous with that of said alternating current circuit and retarding the phase of said grid potential from the 180° lagging point into the leading quadrants.

4. The method of transmitting energy from an alternating current circuit to a direct current circuit under leading power factor conditions on said alternating current circuit by means of a grid controlled electric valve converting apparatus including a commutating capacitor and means for storing a charge on said capacitor which comprises exciting the grids with an alternating potential synchronous with that of said alternating current circuit and retarding the phase of said grid potential through the lagging quadrants into the leading quadrants.

5. Apparatus for transmitting energy between direct and polyphase alternating current circuits under any desired power factor conditions on said alternating current circuit comprising a plurality of inductive windings connected in polyphase relation, an electric valve for each phase winding having one terminal connected thereto, connections between the other terminals of valves connected to alternate phase windings, a commutating capacitor connected between the two connections to alternate valves, and a pair of electric valves each having one terminal connected to one of said connections to alternate valves and having their other terminals connected in a circuit for connection to one side of the direct current circuit.

6. Apparatus for transmitting energy between direct and $p$-phase polyphase alternating current circuits comprising $p$ inductive windings connected in polyphase relation, an electric valve for each phase winding having one terminal connected thereto and provided with a control grid, connections between the other terminals of valves connected to alternate phase windings, a commutating capacitor connected between the two connections to alternate valves, a pair of electric valves provided with control grids, each having one terminal connected to one of said connections to alternate valves and having their other terminals connected in a circuit for connection to one side of the direct current circuit, means for exciting the control grids of the valves connected to the inductive windings at any desired frequency, means for exciting the control grids of said pair of valves at a frequency of $p$ times that of the above mentioned exciting means, and means for shifting the phase of the grid excitations.

7. Apparatus for transmitting energy between direct and alternating current circuits under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, capacitance means in series relationship with the load current of the apparatus, means for utilizing the potential across said capacitance means for commutating the current between said valves, and means for retaining the maximum periodic potential on said capacitance means until the instant of commutation.

8. Apparatus for transmitting energy between direct and alternating current circuits under any desired power factor conditions on said alternating current circuit comprising an inductive winding in energy transmitting relation with respect to said alternating current circuit, means including a group of similarly disposed electric valves interconnecting said winding with one side of said direct current circuit, and a connection from the other side of said direct current circuit to said winding, means for controlling the conductivity of said valves, a capacitor, inductive means for connecting said capacitor in series relationship with the load current of the apparatus, means for utilizing the potential across said capacitance means for commutating the current between said valves, and a pair of electric valves interposed between said capacitor and said inductance means for retaining the maximum periodic potential on said capacitance means until the instant of commutation.

9. Apparatus for transmitting energy between direct and polyphase alternating current circuits under any desired power factor conditions on said alternating current circuit comprising a plurality of inductive windings connected in polyphase relation, an electric valve for each phase winding having one terminal connected thereto, means for controlling the conductivity of said valves, connections between the other terminals of valves connected to alternate phase windings, a commutating capacitor connected between the two connections to alternate valves, a pair of electric valves each having one terminal connected to one of said connections to alternate valves, and a reactor connected between the other terminals of said pair of valves and provided with an electrical midpoint for connection to the direct current circuit.

10. In an apparatus for transmitting energy between direct and polyphase alternating current circuits including a plurality of main electric valves each provided with a control grid and a circuit for commutating the current between said valves including an additional pair of electric valves provided with control grids, means for exciting the grids of certain of said main valves at a given frequency by means of a polyphase inductive winding which, together with the grid-cathode circuits of said valves, comprises a polyphase rectifier, and means for exciting the grids of said additional valves with the pulsating component of said rectifier circuit.

11. In an apparatus for transmitting energy between direct and polyphase alternating current circuits including $n$ pairs of main electric valves each provided with a control grid and a circuit for commutating the current between said valves including an additional pair of electric valves provided with control grids, means for exciting the grids of said main valves at a given frequency including a polyphase inductive winding which together with the grid-cathode circuits of its associated valves comprises a polyphase rectifier, and means for exciting the grids of said additional valves at a frequency equal to $n$ times that of the excitation circuit for said main valves comprising a grid circuit subject to the pulsating component of said rectifier circuit.

12. In an apparatus for transmitting energy between direct and polyphase alternating current circuits including $n$ pairs of main electric valves each provided with a control grid and a circuit for commutating the current between said valves including an additional pair of electric valves provided with control grids, means for exciting the grids of said main valves at a given frequency including a pair of polyphase inductive windings, each of said windings forming, together with the grid-cathode circuit of a valve of each pair, a polyphase rectifier, and means for exciting the grids of said additional valves at a frequency equal to $n$ times that of the excitation circuit for said main valves comprising a grid transformer including a winding connected in each of said rectifier circuits.

ALBERT H. MITTAG.